(12) United States Patent
Zeine

(10) Patent No.: US 8,446,248 B2
(45) Date of Patent: *May 21, 2013

(54) WIRELESS POWER TRANSMISSION SYSTEM

(75) Inventor: Hatem Zeine, Redmond, WA (US)

(73) Assignee: Omnilectric, Inc., Kirkland, WA (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/812,060

(22) Filed: Jun. 14, 2007

(65) Prior Publication Data

US 2008/0309452 A1    Dec. 18, 2008

(51) Int. Cl.
| | |
|---|---|
| G05B 19/00 | (2006.01) |
| G05B 23/00 | (2006.01) |
| G06F 7/00 | (2006.01) |
| G06F 7/04 | (2006.01) |
| G08B 29/00 | (2006.01) |
| G08B 1/00 | (2006.01) |
| G08C 19/00 | (2006.01) |
| H04B 3/00 | (2006.01) |
| H04B 1/00 | (2006.01) |
| H04Q 1/00 | (2006.01) |
| H04Q 9/00 | (2006.01) |

(52) U.S. Cl.
USPC .......................................... 340/5.1; 340/333

(58) Field of Classification Search
USPC ................. 340/572.7, 854, 5.1; 455/343.1
See application file for complete search history.

(56) References Cited

U.S. PATENT DOCUMENTS

| | | | |
|---|---|---|---|
| 3,989,994 A | | 11/1976 | Brown |
| 4,257,050 A | * | 3/1981 | Ploussios ...................... 342/372 |
| 4,361,892 A | * | 11/1982 | Martin ......................... 375/232 |
| 4,685,047 A | | 8/1987 | Phillips, Sr. |
| 4,779,097 A | * | 10/1988 | Morchin ....................... 342/368 |
| 5,218,374 A | | 6/1993 | Koert et al. |

(Continued)

FOREIGN PATENT DOCUMENTS

| | | |
|---|---|---|
| JP | 07-236204 | 9/1995 |
| JP | 08-103039 | 4/1996 |

(Continued)

OTHER PUBLICATIONS

Smart Antennas for Wireless Mobile Communication http://www.antennasonline.com/ast_newsletter2_10-04.htm.

(Continued)

*Primary Examiner* — Brian Zimmerman
*Assistant Examiner* — Cal Eustaquio
(74) *Attorney, Agent, or Firm* — Volpe and Koenig, P.C.

(57) ABSTRACT

The wireless power transmission is a system for providing wireless charging and/or primary power to electronic/electrical devices via microwave energy. The microwave energy is focused onto a device to be charged by a power transmitter having one or more adaptively-phased microwave array emitters. Rectennas within the device to be charged receive and rectify the microwave energy and use it for battery charging and/or for primary power. A communications channel is opened between the wireless power source and the device to be charged. The device to be charged reports to the power source via the channel a received beam signal strength at the rectennas. This information is used by the system to adjust the transmitting phases of the microwave array emitters until a maximum microwave energy is reported by the device to be charged. Backscatter is minimized by physically configuring the microwave array emitters in a substantially non-uniform, non-coplanar manner.

8 Claims, 6 Drawing Sheets

U.S. PATENT DOCUMENTS

| | | | |
|---|---|---|---|
| 5,223,781 A | 6/1993 | Criswell et al. | |
| 5,400,037 A * | 3/1995 | East | 342/372 |
| 5,486,833 A | 1/1996 | Barrett | |
| 5,503,350 A | 4/1996 | Foote | |
| 5,733,313 A | 3/1998 | Barreras, Sr. et al. | |
| 6,114,834 A | 9/2000 | Parise | |
| 6,127,799 A | 10/2000 | Krishnan | |
| 6,474,341 B1 | 11/2002 | Hunter et al. | |
| 6,615,074 B2 | 9/2003 | Mickle et al. | |
| 6,621,470 B1 | 9/2003 | Boeringer et al. | |
| 6,690,324 B2 | 2/2004 | Vail et al. | |
| 6,721,159 B2 | 4/2004 | Takashige et al. | |
| 6,738,017 B2 | 5/2004 | Jacomb-Hood | |
| 6,856,291 B2 | 2/2005 | Mickle et al. | |
| 6,882,128 B1 | 4/2005 | Rahmel et al. | |
| 6,967,462 B1 * | 11/2005 | Landis | 320/101 |
| 7,068,991 B2 | 6/2006 | Parise | |
| 7,084,605 B2 | 8/2006 | Mickle et al. | |
| 2002/0057219 A1 | 5/2002 | Obayashi | |
| 2004/0140929 A1 | 7/2004 | Toda et al. | |
| 2008/0014897 A1 | 1/2008 | Cook et al. | |
| 2008/0042847 A1 * | 2/2008 | Hollister et al. | 340/572.7 |
| 2009/0284220 A1 | 11/2009 | Toncich et al. | |
| 2010/0033021 A1 | 2/2010 | Bennett | |
| 2010/0133920 A1 | 6/2010 | Joannopoulos et al. | |

FOREIGN PATENT DOCUMENTS

| | | |
|---|---|---|
| JP | 08-130840 | 5/1996 |
| JP | 2002-152995 | 5/2002 |
| JP | 2005-261187 | 9/2005 |
| JP | 2007-022382 | 2/2007 |
| KR | 2005-0096068 | 10/2005 |
| KR | 10-0654623 | 12/2006 |
| KR | 2007-0055086 | 5/2007 |
| WO | 01/03438 | 1/2001 |

OTHER PUBLICATIONS

Erictric, "Wireless Charging? Nokia's Newest Prototype Phone Has It," (Jun. 17, 2009) available at http://erictric.com/2009/06/17/wireless-charging-nokias-newest-prototype-phone-has-it/.

Smart Antennas for Wireless Mobile Communication, http://www.antennasonline.com/ast_newsletter2_10-04.htm.

* cited by examiner

WIRELESS POWER TRANSMISSION SYSTEM

BACKGROUND OF THE INVENTION

1. Field of the Invention

The present invention relates generally to power transmission systems and battery chargers, and particularly to a method and system for wireless power transmission by microwave transmission to power a device requiring electrical power.

2. Description of the Related Art

Many portable electronic devices are powered by batteries. Rechargeable batteries are often used to avoid the cost of replacing conventional dry-cell batteries, and to conserve precious resources. However, recharging batteries with conventional rechargeable battery chargers requires access to an a.c. power outlet, which is sometimes not available. It would therefore be desirable to derive power for a battery charger from electromagnetic radiation.

While solar-powered battery chargers are known, solar cells are expensive, and a large array of solar cells may be required to charge a battery of any significant capacity. Another potential source of electromagnetic energy that would provide power to a battery charger at a location remote from the a.c. power mains is microwave energy, which might be derived from a solar powered satellite and transmitted to earth by microwave beams, or derived from ambient radio frequency energy from cell phone transmitters and the like. However, there are several problems associated with the efficient delivery of power by microwave transmission that have precluded the use of dedicated terrestrial microwave power transmitters for the purpose.

Assuming a single source power transmission of electromagnetic (EM) signal, an EM signal gets reduced by a factor of $$\frac{1}{r^2}$$

in magnitude over a distance r. Thus, the received power at a large distance from the EM transmitter is a small fraction of the power transmitted.

To increase the power of the received signal, we would have to boost the transmission power. Assuming that the transmitted signal has an efficient reception at three centimeters from the EM transmitter, receiving the same signal power over a useful distance of three meters would entail boosting the transmitted power by 10,000×. Such power transmission is wasteful, as most of the energy would be transmitted and not received by the intended devices, it could be hazardous to living tissue, it would most likely interfere with most electronic devices in the immediate vicinity, and it may be dissipated as heat.

Utilizing a directional antenna has several challenges, some of which are: knowing where to point it; the mechanical devices needed to track it would be noisy and unreliable; and creating interference for devices in the line of sight of the transmission.

Directional power transmission generally requires knowing the location of the device to be able to point the signal in the right direction to enhance the power transmission efficiency. However, even when the device is located, efficient transmission is not guaranteed due to reflections and interference of objects in the vicinity of the receiving device.

Thus, a wireless power transmission system solving the aforementioned problems is desired.

SUMMARY OF THE INVENTION

The wireless power transmission is a method and system for providing wireless charging and/or primary power to electronic/electrical devices via microwave energy. The microwave energy is provided by a power transmitter having one or more adaptively-phased microwave array emitters capable of being focused onto a device to be charged without the need to know the location of the device. Rectennas within the device to be charged receive and rectify the microwave energy and use it for battery charging and/or for primary power. A communications channel is opened between the wireless power source and the device to be charged to coordinate the transmitter with the charging device.

The device to be charged reports the received beam signal strength at the rectennas to the power source via the side channel. This information is used by the system to adjust the transmitting phases of the microwave array emitters until maximum microwave energy is reported by the device to be charged.

Alternatively, the array elements can be set to receive a calibration signal from the device being charged. Each array element can detect/report phase information from the received calibration signal. Subsequently, each array element uses the detected phase for that element as a transmitting phase back to the device being charged.

Backscatter is minimized by physically configuring the microwave array emitters in a substantially non-uniform, non-coplanar manner.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
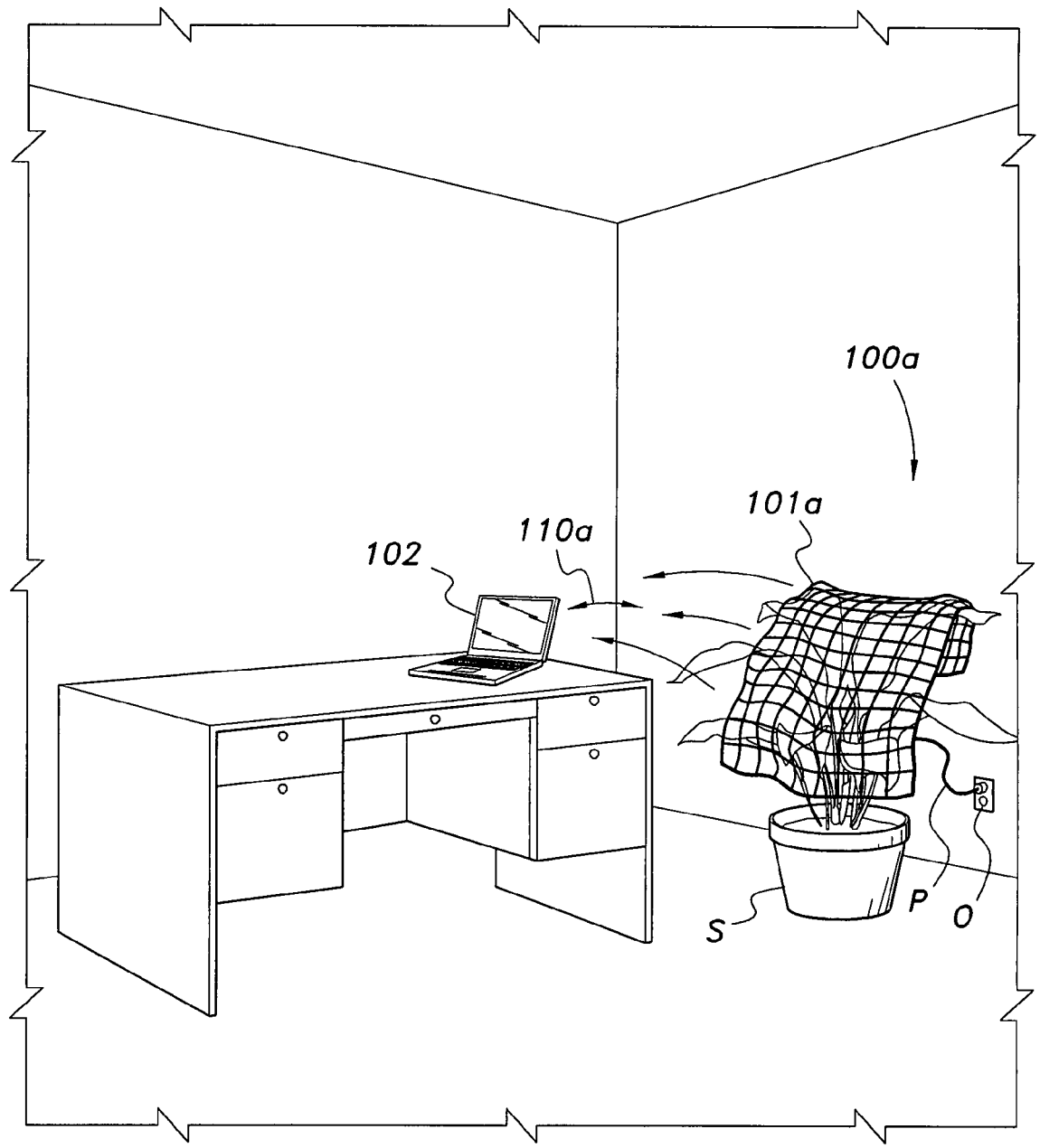
FIG. 1A is an environmental, perspective view of a first embodiment of a wireless power transmission system according to the present invention.
Figure 1B:
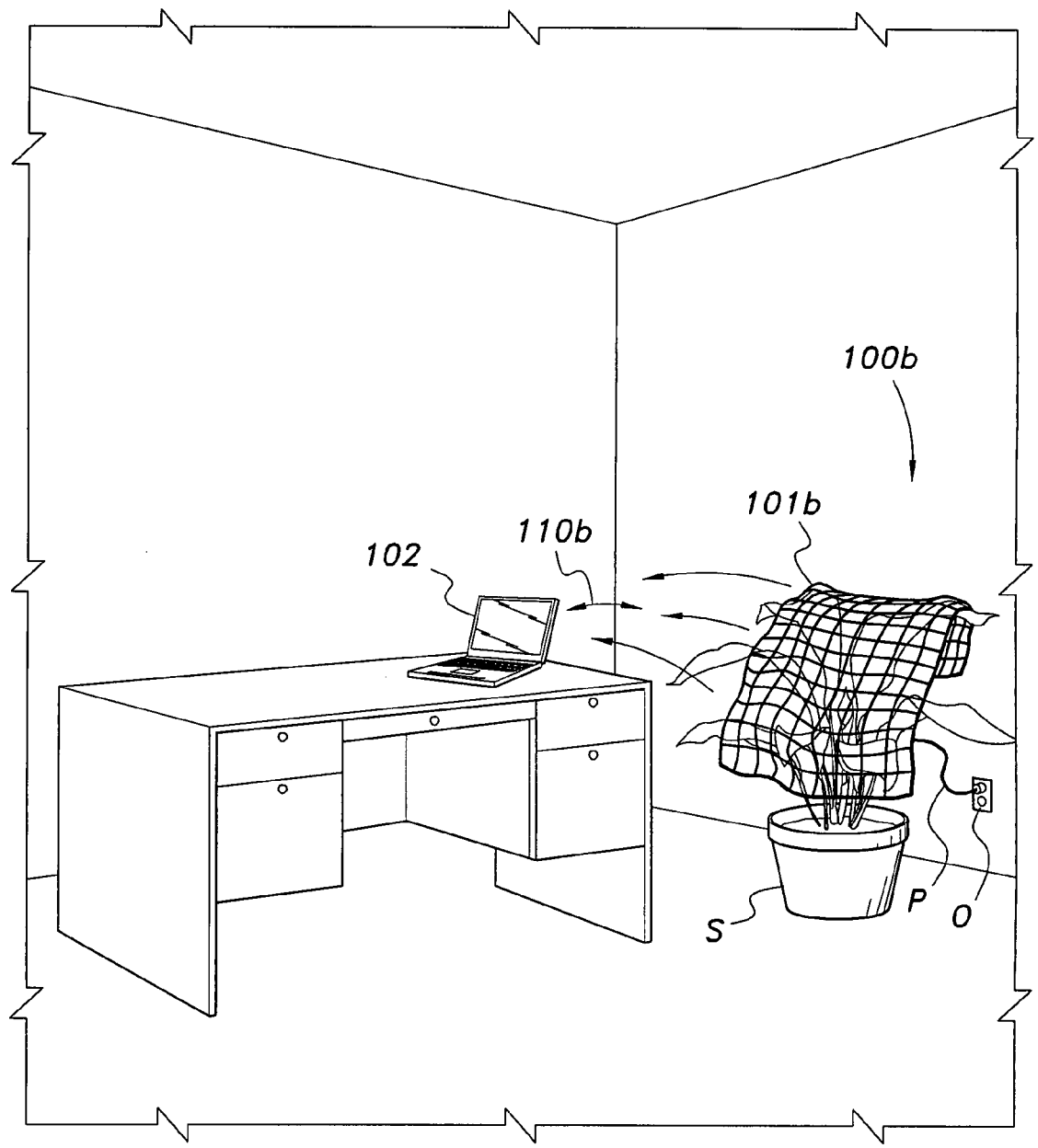
FIG. 1B is an environmental, perspective view of a second embodiment of a wireless power transmission system according to the present invention.

As shown in FIGS. 1A-1B, the present invention includes a system 100a, or alternatively system 100b, for providing wireless charging and/or primary power to electronic/electrical devices, such as laptop computer 102, or the like, via microwave energy. In either system 100a or system 100b, power transmission grid 101a or alternative power transmission grid 101b can obtain operational power from the a.c. mains via power cord P being plugged into power outlet O. The microwave transmission frequency is preferably an available FCC unregulated frequency having a suitable wavelength. Since the wavelength can limit resolving power of the phased array 101a or alternative phased array 101b, a preferred frequency, although not limiting the choice of other frequencies that the system may operate on, has been determined to be 5.8 GHz (5.17 cm wavelength), which is suitable for power transmission to such devices as a laptop, cell phone, PDA, etc., over distances on the scale of a room, auditorium, or the like.

As shown in FIGS. 1A-3B, the microwave energy is focused onto a device to be charged by a power source 300 connected to one or more adaptively-phased microwave array emitters 204, i.e., antennae or radiators. According to the present invention, the microwave energy from the adaptively-phased microwave array emitters 204 may be focused onto the device without the need to know the location of the device. As shown in FIGS. 1A, 1B, and 3A-3B, preferably highly efficient rectennas 340 (a rectenna is a rectifying antenna that converts microwave energy directly into d.c. electricity; such devices are known in the art and will not be described further herein) within the device to be charged 102 receive and rectify the microwave energy and use it for charging battery 370 via charging and/or for primary power to the device 102 as determined by control logic 350. In a first embodiment, a communications channel is opened between the wireless power source 100a and power receiver 330b in the device to be charged 102 on a frequency other than the frequency used to convey power.

The device to be charged 102 relays a received beam signal strength at the rectennas 340 over the communications channel 110a to a receiver section of communications device 320 in the power transmitter 330a of system 100a via a signal from a transmitter section of communications device 360 in the power receiver 330b. This information is used by control logic 310 of the system 100a to power up, power down, and adjust the transmitting phases of the microwave array emitter nodes 204 until a maximum microwave energy beam 301 is radiated by the array 110a, as reported by the device to be charged 102.

Each emitter 204, being connected to a single source of the desired transmission frequency, can transmit a signal with a specific phase difference, which is a multiple of $\pi/2$. The $\pi/2$ phase increments are exemplary only, and other phase increments such as $\pi/4$, $\pi/8$, $\pi/16$, and the like, are possible. Preferably, power is not adjusted, except that the emitter 204 can be turned off or turned on to a desired phase.

Figure 2A:
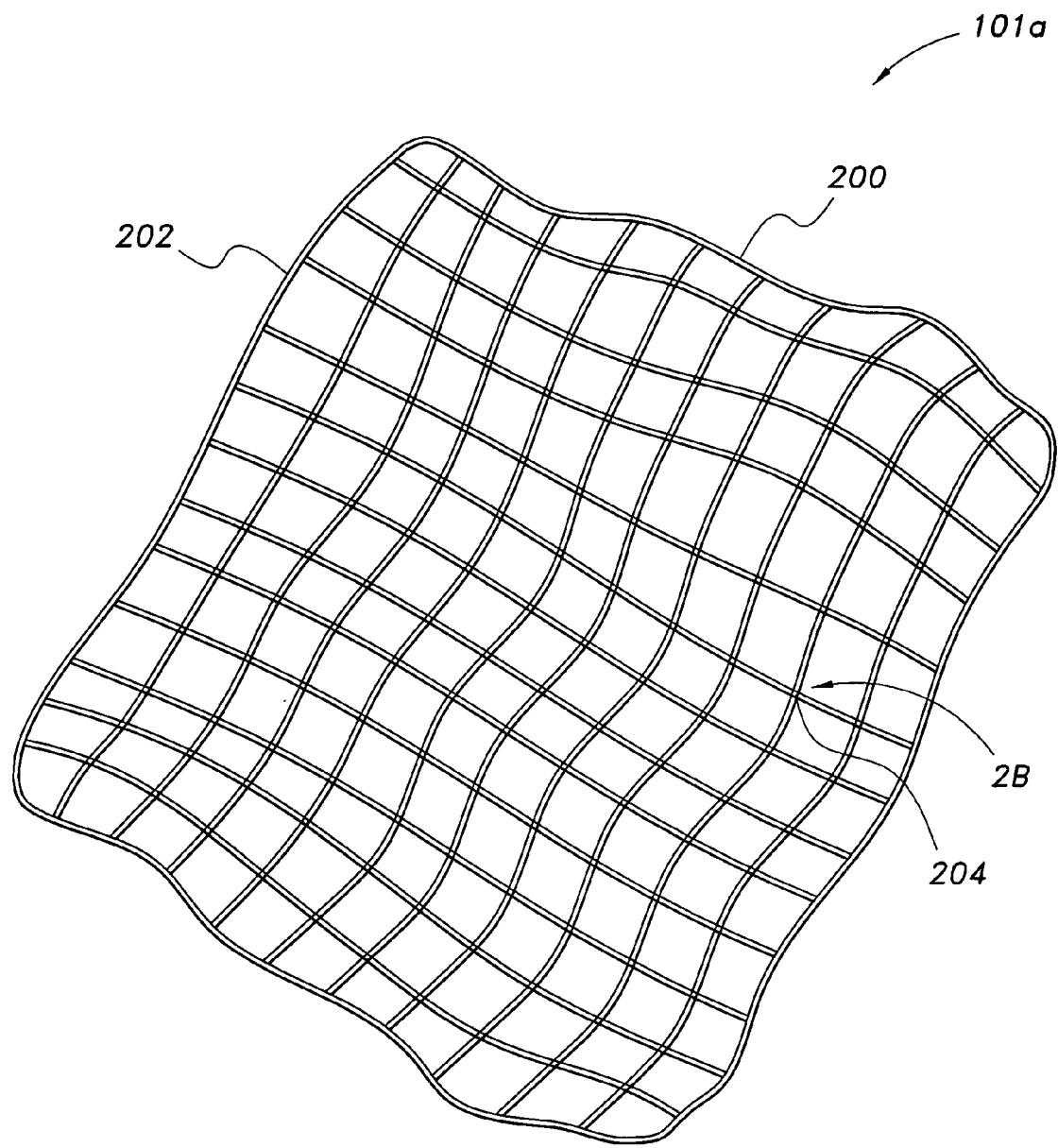
FIG. 2A is a perspective view of the phased array net antenna for a microwave transmitter in a wireless power transmission system according to the present invention.
Figure 2B:
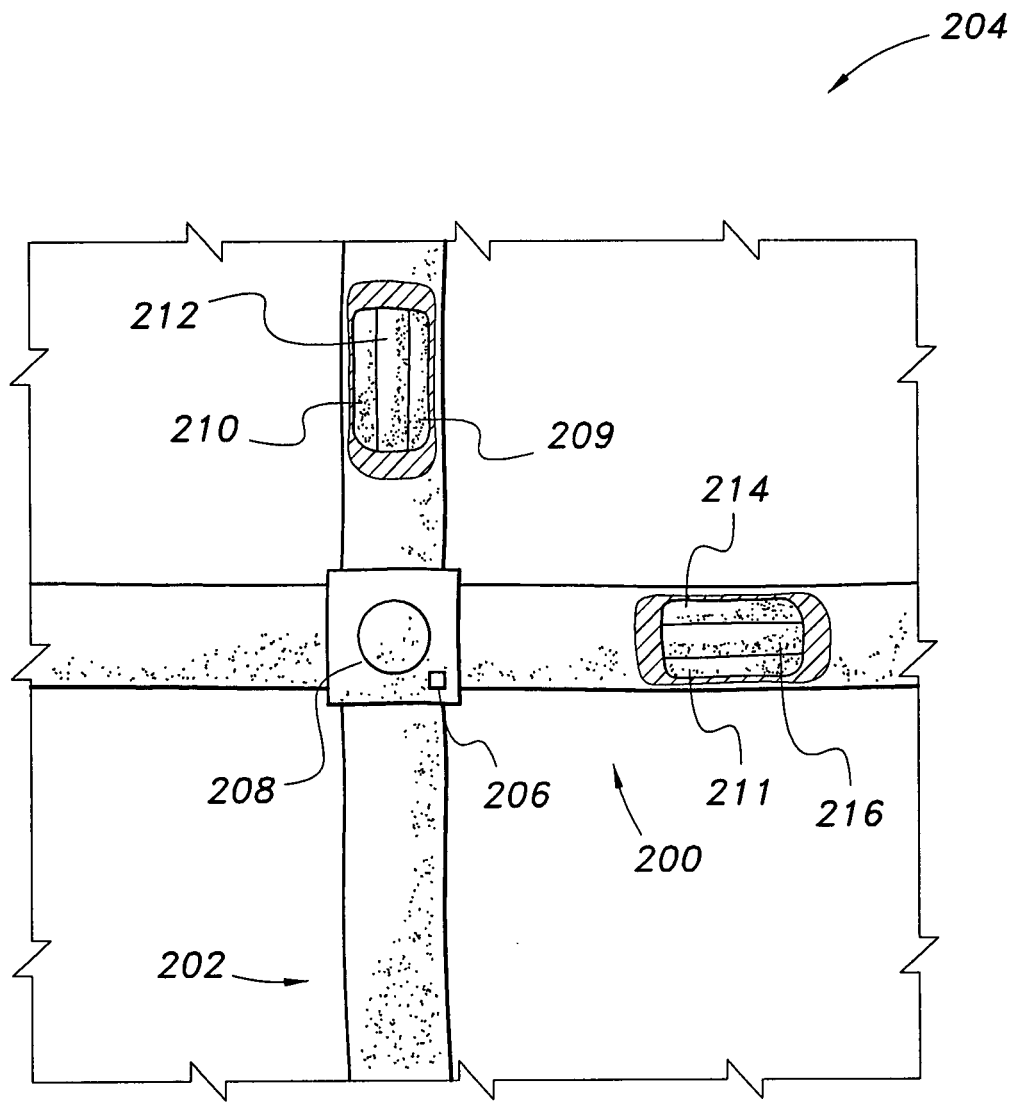
FIG. 2B is a diagrammatic view of a power transmission node in a wireless power transmission system according to the present invention.

As most clearly shown in FIGS. 2A-2B, vertical and horizontal cables intersect at each array node 204. This configuration applies to either array 101a or array 101b. Within vertical cable 202, wire 210 is a zero phase feed line. Wire 212 is a $\frac{1}{2}\pi$ phase feed line, and wire 209 is a vertical control line. Similarly, within horizontal cable 200, wire 214 is a Tr phase feed line. Wire 216 is a $\frac{3}{2}\pi$ phase feed line, and wire 211 is a horizontal control line. Control lines 209 and 211 can be connected to the controller 310 in order to control which phase is active on any given node 204. Single antenna control can be on a chip 206, while the actual node radiator or antenna 208 may be formed as a circular element surrounding the geometric center of the node 204. It should be understood that either a single controller or a plurality of controllers may control one or more of power transmission grids.

An exemplary algorithm of control logic 310 for system 100a might be as follows: (1) the power receiver 330 can use the communications channel 110a to declare its presence to any transmitters 330a in the vicinity; (2) the power transmitter 330a may communicate its presence on the communications channel 1110a and start transmitting with only one of its antennae 208 or nodes 204; (3) the power receiver 330b may acknowledge receiving the faint signal on the communications channel 110a; (4) the power transmitter 330a switches on another antenna 208 or node 204 with a default phase of zero and may ask the receiver 330b over the communications channel 110a for signal strength; (5) the power receiver 330b may send back a signal indicating that the received signal is higher, the same, or lower than before; (6) if the signal is lower than or the same as before, the controller 310 may cause the phase at node 204 to increase its phase by $\frac{1}{2}\pi$ and request another signal strength transmission; (7) steps 5 and 6 are repeated for all phases; (8) if no increase in signal strength is observed then that particular node 204 is switched off and another node is used in the process, repeating from step 4; (9) steps 4-6 are repeated until all emitters nodes are in use.

Figure 3A:
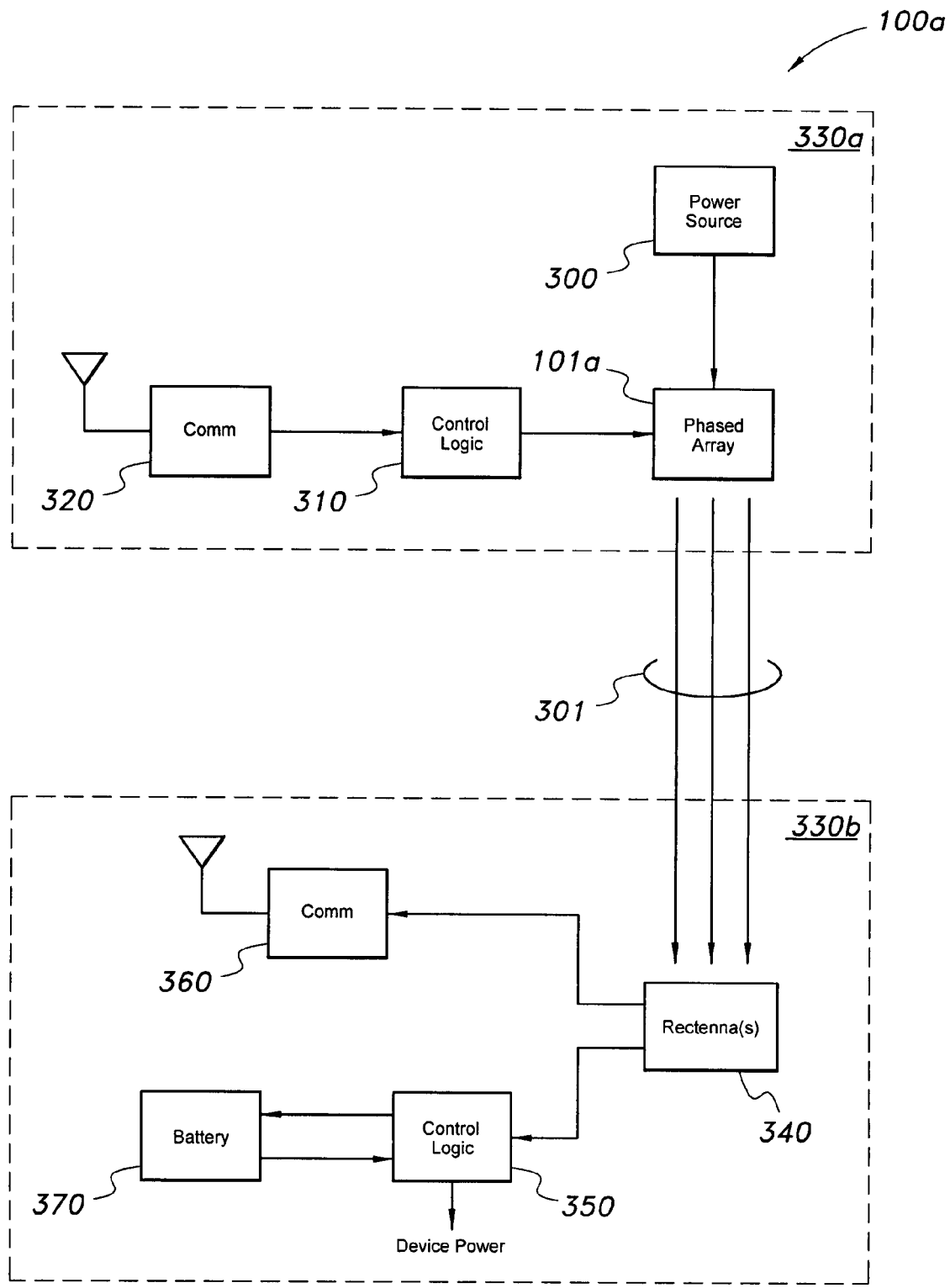
FIG. 3A is a block diagram of the first embodiment of the wireless power transmission system according to the present invention.
Figure 3B:
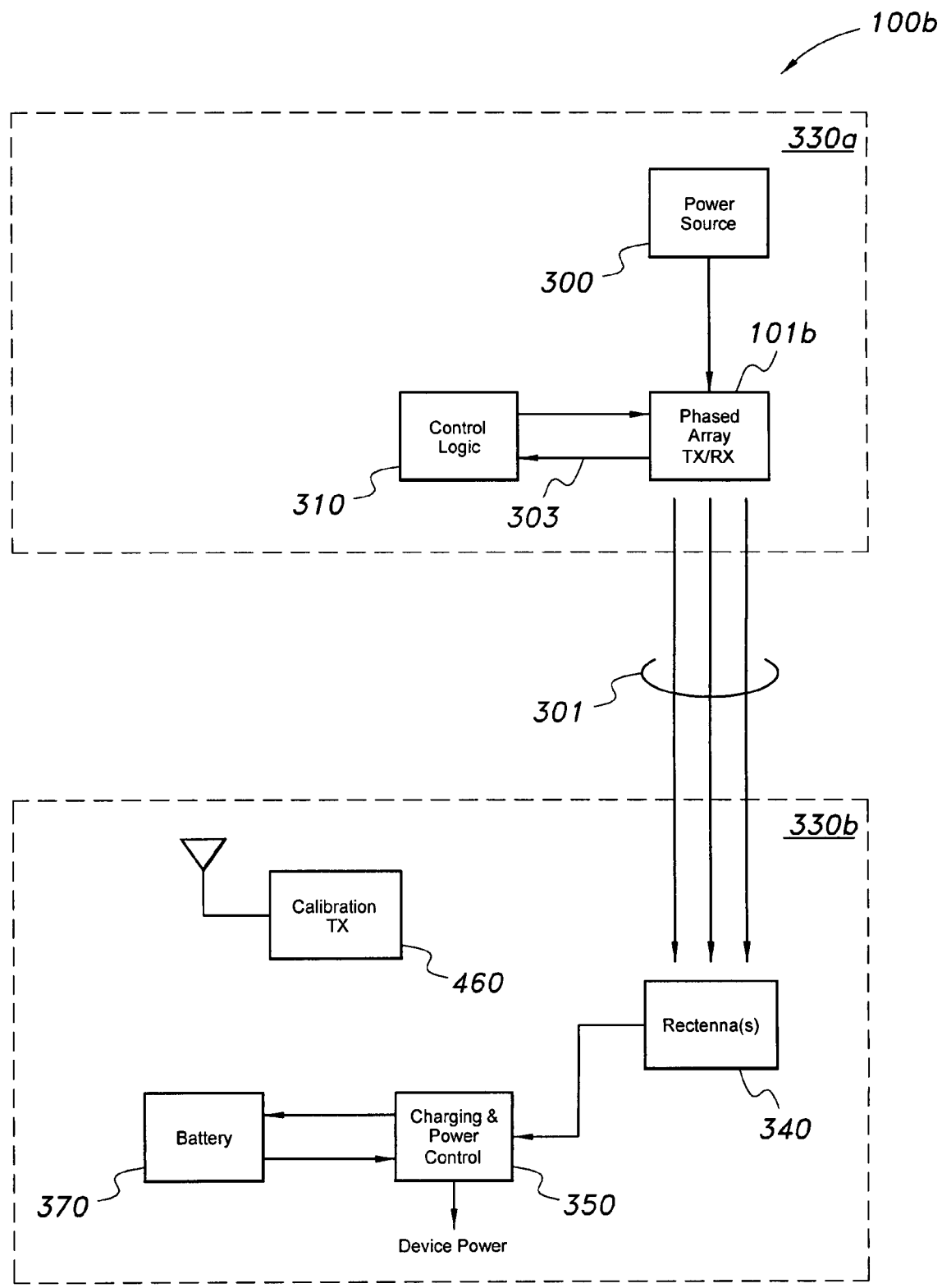
FIG. 3B is a block diagram of the second embodiment of the wireless power transmission system according to the present invention.

In a second embodiment, as most clearly shown in FIGS. 2B and 3B, each array element or node 204 can be set to receive a calibration signal from a calibration transmitter 460 in the power receiving system 330b. Each array element or node 204 can send the received calibration signal detected at that node 204 to the control logic 310 via data line 303. Subsequently, either controller 310, controller 206, or both controllers in combination may set each array element or node 204 to the detected phase for that element as a transmitting phase in order to send an optimized power beam 301 back to the power receiver 330b. In both embodiments 100a and 100b, a configuration memory device may be in operable communication with the controller logic 310 in order to enable the array to transmit power to a specific location or "hotspot" without first having to communicate to the device to be charged 102. This feature is useful in sending power beam 301 to the device to be charged 102 when the device to be charged 102 has no reserve power to establish communications channel 110a or 1110b.

An exemplary array 101a or 101b can be a 30×30 grid net of approximately one meter per side, with each intersection of wires having a single transmission antenna 204. Preferably array grid 101a or 101b is made of flexible/soft materials. Flexibility of grid material enables a user to physically configure the microwave array emitter grid 101a or 101b in a substantially non-uniform, non-coplanar manner, i.e., spread out, but not flat, in order to minimize backscatter and blind spots that ordinarily occur in flat, regularly disposed arrays having discrete phase differences. As shown in FIGS. 1A-1B, either array 101a or array 101b is sufficiently flexible so that it can be draped over a support structure, such as potted plant S, to provide the preferably non-uniform, non-coplanar configuration.

In this manner, the inverse-square law is successfully challenged, since the phased antenna is directional, thereby creating gain via a constructively phased beam signal that can be received at the receiving device 102. Moreover, use of a phased array, such as 101a or 101b, obviates the necessity of using a more cumbersome, unsightly device such as a physical directional antenna, i.e., a dish, a Yagi, or the like. Additionally, due to the efficiency of the power transmission process, low power may be used for the transmission such that the electromagnetic (EM) signal can have most of its strength proximate the receiving device instead of spread all over, in order not to harm the environment or cause interference with devices located elsewhere.

Once the signal is received and its power is available, the process of converting the approximately 5.80 GHz AC current coming from the antenna into a DC current to charge the battery 370, power storage capacitor, or the like, is done with lower voltage rectifiers capable of the task. These rectifiers can either be based on small area Schottky diode or utilize a resonance with a 5.80 GHz oscillating circuit in the same phase as the received signal, thus enhancing its power to the point of overcoming the voltage drop of the diodes used in the rectifier portion of the rectenna 340.

It is to be understood that the present invention is not limited to the embodiments described above, but encompasses any and all embodiments within the scope of the following claims.

What is claimed is:

1. A wireless power transmitter, comprising:
a controller;
a phased array antenna having a plurality of microwave array emitters each for emitting a power transmission signal, the emitters being adaptively-phased by the controller to emit the power transmission signal at a respective selected phase; and
a receiver operable on a side channel frequency to receive a plurality of multipath power signal strength signals from a device to be charged by the microwave power transmission signals;
the controller further configured to selectively activate each individual microwave array emitter to transmit the power transmission signal at a first selected phase from that activated individual microwave array emitter, the controller further configured to adjust the respective selected phase by an increment of the activated individual microwave array emitter in response to a first power signal strength signal received from the device to be charged in order to adjust the phase of the power transmission signal from that activated individual microwave array emitter and wherein the controller is configured to receive subsequent multipath power signal strength reports from the device to be charged and adjust the respective selected phase of that activated individual microwave array emitter by an additional increment in response to the subsequent power signal strength reports if the subsequent power signal strength report indicates the power level at which the power transmission signal was received is lower than the power level at which the prior power transmission signal was received from that activated individual microwave array emitter;
wherein each microwave array emitter emits the power transmission signal to the device to be charged without utilizing a location signal, if any, from the device to be charged that indicates a location of the device to be charged;
wherein the microwave transmitter and device to be charged are not required to be in line of sight of each other, and
wherein the microwave transmitter is non-directional.

2. The wireless power transmitter according to claim 1, wherein the plurality of adaptively-phased emitters are physically arranged in a substantially non-uniform, non-coplanar manner.

3. The wireless power transmitter according to claim 1, wherein the power transmission signal emitted from the microwave power transmitter has a frequency at or above about 100 MHz.

4. The wireless power transmitter according to claim 1, wherein the controller comprises circuitry for adjusting the phase of the adaptively-phased emitters in predetermined phase angle increments of at least one of $\pi/2$, $\pi/4$, $\pi/8$, or $\pi/16$.

5. The wireless power transmitter according to claim 1, wherein the phased array antenna comprises a grid of cables disposed orthogonal to each other, the cables intersecting to define emitter nodes, each of the cables having a plurality of power transmission lines dedicated to transmission of power transmission signals at different phase angles and at least one phase control line to activate a selected one of the plurality of power transmission lines.

6. The wireless power transmitter according to claim 5, wherein the grid is made of flexible material so that the cable grid can be draped over solid objects of various shapes.

7. The wireless power transmitter according to claim 1, further comprising a configuration memory device in operable communication with the controller to enable the phased array antenna to transmit power to a specific location without first having to communicate with the device to be charged.

8. A wireless power transmission system, comprising:
a power transmitter; and
a charging receiver;
the power transmitter comprising:
a controller;
a phased array antenna having a plurality of microwave array emitters each for emitting a power transmission signal, the emitters being adaptively-phased by the controller to emit the power transmission signal at a respective selected phase; and; and
a receiver operable on a side channel frequency to receive a plurality of multipath power signal strength signals from a device to be charged by the microwave power transmission signals;
the controller further configured to selectively activate each individual microwave array emitter to transmit the power transmission signal at a first selected phase from that activated individual microwave array emitter, the controller further configured to adjust the respective selected phase by an increment of the activated individual microwave array emitter in response to a first power signal strength signal received from the device to be charged in order to adjust the phase of the power transmission signal from that activated individual microwave array emitter and wherein the controller is configured to receive subsequent multipath power signal strength reports from the device to be charged
and adjust the respective selected phase of that activated individual microwave array emitter by an additional increment in response to the subsequent power signal strength reports if the subsequent power signal strength report indicates the power level at which the power transmission signal was received is lower than the power level at which the prior power transmission signal was received from that activated individual microwave array emitter;
wherein each microwave array emitter emits the power transmission signal to the device to be charged without utilizing a location signal, if any, from the charging receiver that indicates a location of the charging receiver, and wherein the power transmitter and charging receiver are not required to be in line of sight of each other;
the charging receiver comprising:
a rectenna configured to receive a power transmission signal having a predetermined phase to charge the charging receiver;
a transmitter operable on a side channel frequency; and
a power signal strength signal reporting circuit configured to control the transmitter to communicate the first power signal strength signal of the received power transmission signal to the power transmitter on the side channel without transmitting a location signal to the power transmitter indicating the location of the wireless power charging receiver, and to transmit subsequent power signal strength signals associated with subsequently received power transmission signals, wherein each subsequently received power signal strength signal indicates whether its associated received power transmission signal is at a higher, lower, or same power level as a previously received power transmission signal;

wherein the charging receiver is not required to be in line of sight with the transmitter, and wherein the microwave transmitter is non-directional.

* * * * *